C. H. WILLIAMS, Jr.
BRAKE BEAM.
APPLICATION FILED JUNE 3, 1909.
957,399.
Patented May 10, 1910.
FIG. 1.
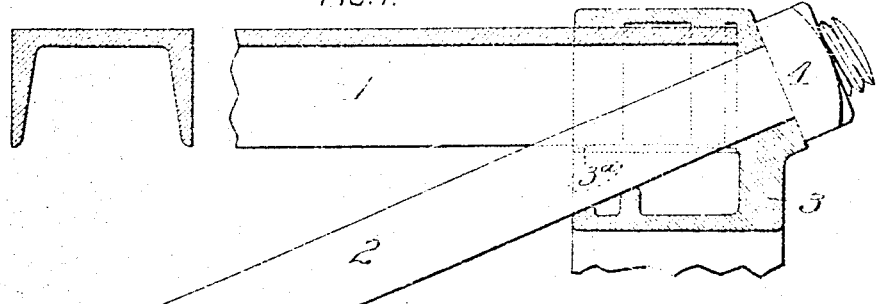
FIG. 2.
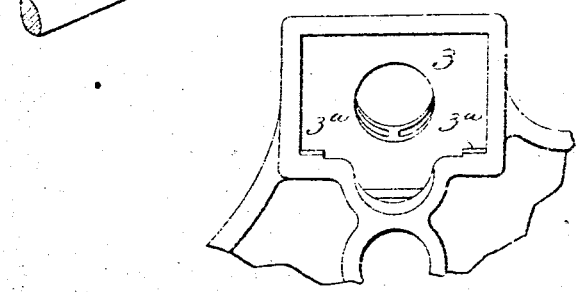
FIG. 3.
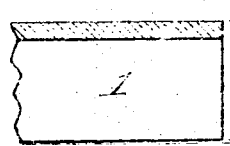 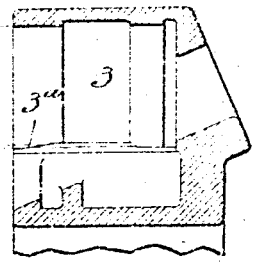
FIG. 4.
FIG. 5
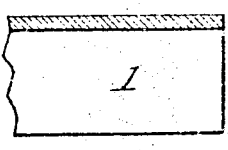 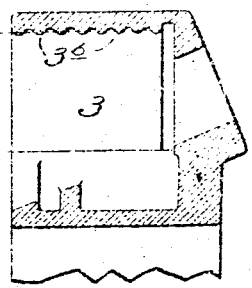
FIG. 6.
WITNESSES
INVENTOR
Charles H Williams, Jr.
By F. R. Cornwall, ATT'Y

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION.

BRAKE-BEAM.

957,399.

Specification of Letters Patent. Patented May 10, 1910.

Application filed June 3, 1909. Serial No. 439,911.

*To all whom it may concern:*

Be it known that I, CHARLES H. WILLIAMS, Jr., a citizen of the United States, residing at Chicago, Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1 is a sectional view through one end of a trussed brake beam embodying my improvement. Fig. 2 is an elevational view of a portion of a brake head, showing the socket. Fig. 3 is a sectional view illustrating a portion of the brake head and compression member before the parts are assembled. Fig. 4 is a similar view after the parts are assembled. Fig. 5 is a detailed view of a modified form. Fig. 6 is a detailed view of another modified form of my invention.

This invention relates to a new and useful improvement in brake beams and particularly to a novel means whereby the brake head, or thrust block, is made to fit tightly on the end of the compression member.

In the manufacture of brake beams in which the compression member is of a commercially rolled form, such, for instance as the channel form illustrated in the drawings, irregularities exist as to the depth of the channels, and, consequently it has been the practice heretofore to make the socket in the thrust block or brake head, which is to receive the end of such commercially rolled compression member, of a size to accommodate the largest size commercially rolled member. In a three-inch channel, that is, a channel which is three inches wide from edge to edge, and which dimension is usually well preserved in the rolling of the channel, the flanges are also intended to be of uniform dimensions but, as a matter of fact, they vary considerably, such variation having been noted to amount to as much as three-sixteenths of an inch in the depths of the legs of the channel. Indeed, variations occur between the depths of the legs of the same channel, so that it is impossible to prepare a socket of uniform size which will fit commercially rolled members whose flanges are subject to such variation.

Where a thrust block or brake head does not snugly fit upon the end of the compression member, a space or void, as it might be termed, has to be taken up before the brake cylinder can apply the proper power to the brakes. This may, perhaps, be better understood by reference to the tests to which brake beams are subjected before being placed in service, to determine the deflection of the beam. Railroads frequently specify that under a given load the beam shall not deflect more than a certain part of an inch, and unless the beam is strong enough to stand up under such an applied load without deflecting the specified minimum, then it will be rejected. In one instance, a railroad specified that its brakebeams should sustain a load of twelve thousand pounds with not more than one-sixteenth of an inch (.0625) deflection. A beam of the character illustrated in the drawings, but without having means for taking up lost motion between the ends of the compression member and the thrust block or head, was submitted to be tested, and, notwithstanding the fact that the ends of the tension member were screwed up sufficiently tight to put a proper camber in the compression member, the beam showed a deflection of over one-sixteenth of an inch when a five thousand pound load was applied. After the parts of the beam, under this load, had been seated "home", that is, after the lost motion had been taken up, the beam was further loaded by the application of over twelve thousand pounds additional pressure, but showed less than one-sixteenth additional deflection.

It is apparent from the above that if it takes the application of an initial load to consume the lost motion referred to, that the piston in the brake cylinder is forced to travel unnecessarily in taking up this wasted deflection of the beam before its power can be applied through the beam as braking power. When it is considered that the lost motion or wasted deflection in the beam is sometimes multiplied about sixteen times before reaching the brake cylinder, it will be appreciated that the stroke of the piston in the brake cylinder is thus made unnecessarily long.

My present invention consists in making the socket in the thrust block or brake head of such size as to accommodate the smallest commercially rolled member of the size used. By "smallest" I mean a commercially rolled member having the shortest legs, or narrowest flanges, due to irregularities or inequalities in its manufacture. I provide means whereby the socket in the thrust block or brake head may either be cut away upon the introduction of a commercially rolled member, any of whose dimensions are larger than the smallest dimensions for which the socket is designed to receive, whereby when said commercially rolled member is fully inserted into the socket, there is no lost motion between the parts and, consequently, no wasted deflection and resultant unnecessary stroke of the piston in the brake cylinder. By making the parts so they will fit tightly, I am enabled to get the full benefit of the strength of the metal without having to take up any lost motion, and, consequently, brake beams embodying my improvement, when tested, show that they are able to stand maximum loads with minimum deflections.

In the drawings, 1 indicates the compression member which, in this instance, is shown as a commercially rolled channel, although it is obvious that I-beams or other commercially rolled forms may be employed if desired.

2 is the tension member, shown as a rod. In trussed brake beams, there are also struts or lever posts, finger guards, and other accessories, none of which are shown because they form no part of my present invention.

3 is a casting which may be in the nature of a thrust block upon which an adjustable brake head, such as is shown in the Robischung Patent No. 485,823, dated November 8th, 1902, may be mounted; or said casting may be integral with the brake head, as shown in the accompanying drawings. Upon the outer face of this casting, nut 4, which has a threaded connection with the end of the tension member, impinges. Casting 3 is provided with a socket for the reception of the end of the commercially rolled member. The shoulder in the socket, against which the flanges of the commercially rolled member are seated, is raised, as shown in Fig. 3, to such point that the space between said shoulder and the opposite wall of the socket is sufficient to take in the smallest flange. The outer edge of the shoulder is beveled, as shown at 3ª, which bevel is of such depth as to include the largest flange. Casting 3 is arranged upon the end of the compression member, and if the flanges are of such size as to require it, the casting is driven onto the end of the compression member, or forced on by the use of the requisite amount of pressure. The flanges of the commercially rolled member, in riding up the inclined face 3ª, will either be mashed down, or mash down the shoulder in the socket, depending upon which is the softer metal. In either event, a tight fit results, as shown in Fig. 4.

In Fig. 5 I have shown the shoulder as being without the inclined face, the opposite face being corrugated, so that as the channel is introduced the upper edge of the web thereof will be either cut away or mash down the corrugations 3ᵇ.

It is obvious that as far as taking up lost motion is concerned, this could be accomplished by driving in a shim 5, as shown in Fig. 6. As the variable commercially rolled members would require varying thicknesses of shims, I prefer the construction heretofore described, in which the end of the compression member either cuts its path home, is mashed, or mashes the coöperative faces of casting 3, so that a tight fit results and no lost motion is present between these parts.

I am aware that minor changes in the construction, arrangement and combination of the several parts of my device can be made and substituted for those herein shown and described, without in the least departing from the nature and principle of my invention.

Having thus described my invention, what I claim is:

1. In a brake beam, the combination of a commercially rolled member, and a part having a socket to receive said commercially rolled member, said socket being of such size as to tightly fit the "smallest" commercially rolled member.

2. In a brake beam, the combination of a flanged, commercially rolled member, the part having a socket designed to receive said flanged, commercially rolled member, said socket having a dimension as small as the "smallest" dimension of said commercially rolled member.

3. In a brake beam, the combination of a flanged commercially rolled member, of a part having a socket to receive said flanged commercially rolled member, said socket having a seat for the flanges of said commercially rolled member which seat has an inclined portion.

4. In a brake beam, the combination of a commercially rolled member, of a part having a socket designed to receive said member, the inner face of said socket having inclined walls, whereby the commercially rolled member will cut or mash its way to its home position.

5. In a brake beam, the combination of a commercially rolled member, a part having a socket designed to receive the end of said commercially rolled member, and means in the socket for taking up lost motion between said parts.

6. A brake beam part having a socket for the beam member, said socket having walls which are corrugated transversely the axis of the beam member for the purpose specified.

7. In a brake beam, the combination with a beam member, a part having a socket designed to receive said beam member, said socket having some of its dimensions smaller than the corresponding dimensions on the beam member whereby when the beam member is forced into said socket, or vice-versa, the parts will fit tightly.

In testimony whereof I hereunto affix my signature in the presence of two witnesses, this 26th day of May, 1909.

CHARLES H. WILLIAMS, Jr.

Witnesses:
E. T. WALKER,
J. W. WEINLAND.